(12) United States Patent
Bär

(10) Patent No.: US 6,461,559 B1
(45) Date of Patent: Oct. 8, 2002

(54) METHOD FOR SHAPING STRIP-LIKE FILMS

(75) Inventor: Martin Bär, Hettlingen (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/536,285

(22) Filed: Mar. 27, 2000

(30) Foreign Application Priority Data

Apr. 15, 1999 (EP) .............................................. 99810312

(51) Int. Cl.[7] .............................................. B29C 53/24
(52) U.S. Cl. ...................................... 264/287; 264/294
(58) Field of Search ................................ 264/287, 294

(56) References Cited

U.S. PATENT DOCUMENTS 3,470,053 A   9/1969   Rule
3,513,054 A   5/1970   Carrel

FOREIGN PATENT DOCUMENTS

| EP | 0739846 A1 | 10/1996 |
| GB | 1354159 | 5/1974 |
| WO | WO 97/16347 A1 | 5/1997 |

Primary Examiner—Leo B. Tentoni
(74) Attorney, Agent, or Firm—Townsend and Townsend and Crew LLP

(57) ABSTRACT

A method for the shaping of strip-like films (2) involves the following steps:

a) A film strip (2) is continuously forwarded from a film supply to shaping units.

b) The film strip (2) is pleated in a first shaping unit (11). In this, edges (21, 22) are produced which form an angle of inclination to the edges (36) of the film strip having a constant value.

c) After a forwarding of the pleated strip (2') to at least one further shaping unit (12) the former is reshaped in one or more steps. In this the edges (21, 22) are eliminated through plastic deformation by means of a roller pair (120) in edge zones (30b) outside of a middle zone (30a) of the strip and are at the same time replaced by curved edges (31, 32). The angles of inclination of the curved edges continuously increase from the middle zone to the strip edges.

7 Claims, 4 Drawing Sheets

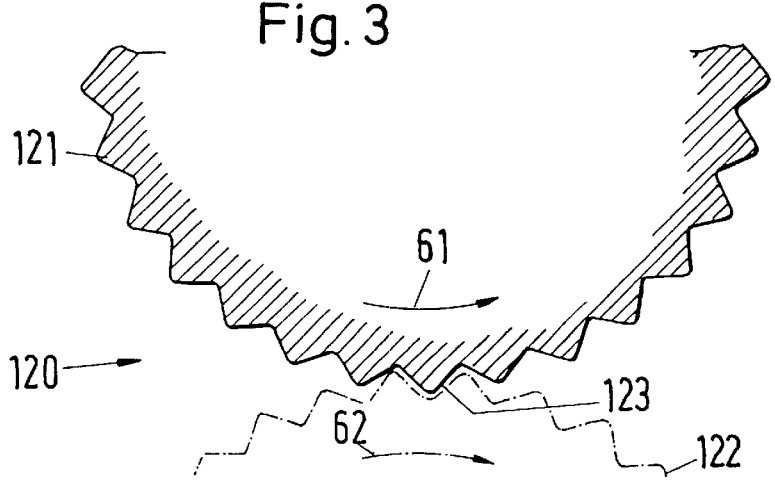
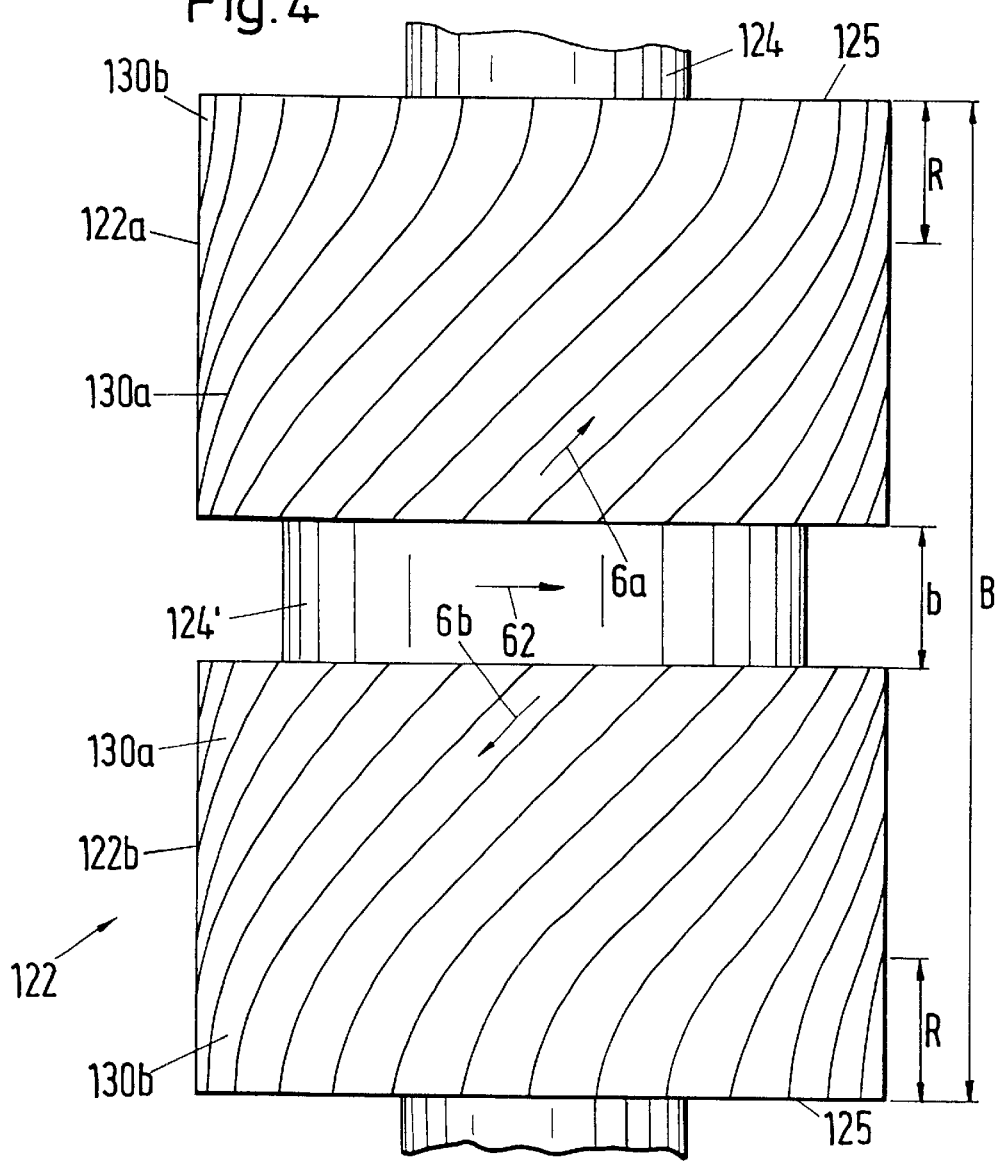

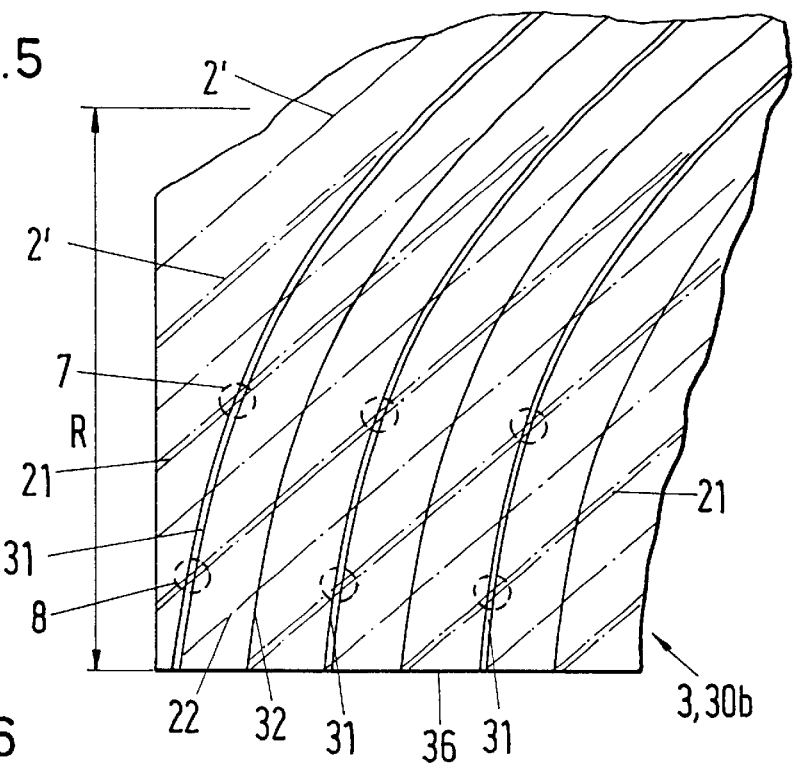
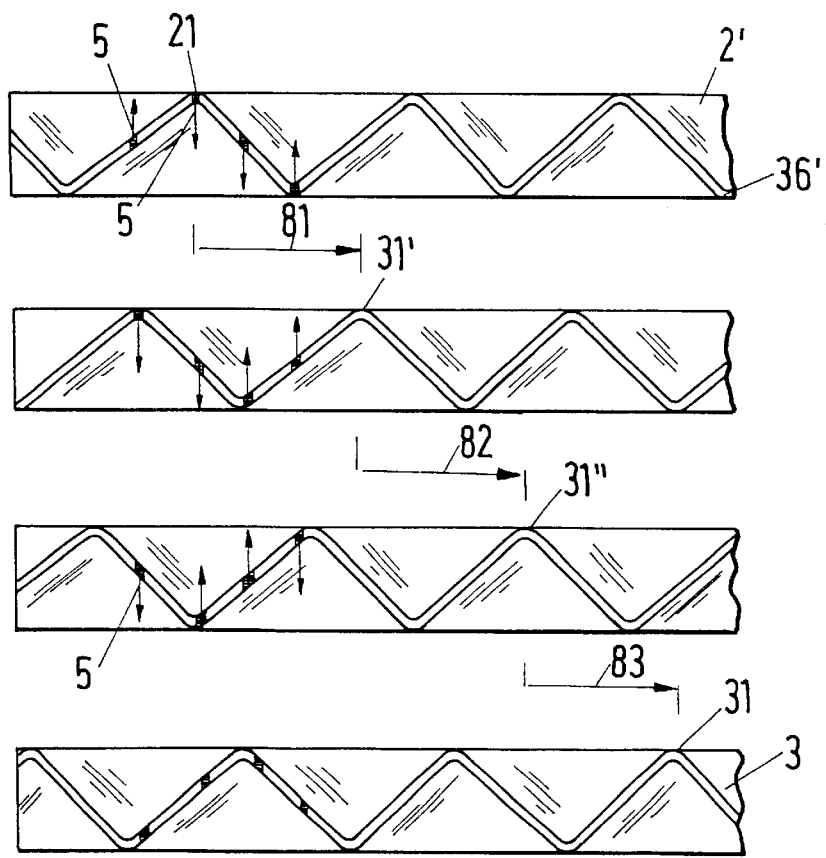

METHOD FOR SHAPING STRIP-LIKE FILMS

BACKGROUND OF THE INVENTION

The invention relates to a method for shaping strip-like films and to a plant for carrying out the method.

A material exchange column with a structured packing is known from WO 97/16247 which is built up of packing elements which are arranged one above the other and which in each case have a cross channel structure, with the channels in an upper and a lower edge zone of a packing element of this kind being formed with a special shape. As a result of the special shaping of the packing element a reduced flow resistance results for a gas which flows through the packing and which passes from one packing element to an adjacent one.

SUMMARY OF THE INVENTION

It is an object of the invention to create a method with which films can be suitably shaped so that the named packings can be manufactured with the named films. In the following the term "strip-like film" will be understood to mean any material strip which can be shaped in accordance with the method in accordance with the invention. A material strip of this kind can for example also consist of a wire mesh or of an expanded metal.

The method for the shaping of strip-like films (2), in particular for structured packings, comprises the following steps:

a) A film strip is continuously forwarded from a film supply to shaping units, b) The film strip is pleated in a first shaping unit. In this, edges are produced which form an angle of inclination to the edges of the film strip having a constant value.

c) After a forwarding of the pleated strip to at least one further shaping unit the latter is reshaped in one or more steps. In this the edges are eliminated through plastic deformation by means of a roller pair in edge zones outside of a middle zone of the strip and are at the same time replaced by curved edges. The angles of inclination of the curved edges continuously increase from the middle zone to the strip edges.

The invention will be described in the following with reference to the drawings.

BRIEF DESCRIPTION OF THE DRAWINGS

FIG. 3 is the cross-sectional profile of a roller pair, FIG. 4 shows the lower roller of the roller pair of FIG. 3 with two axially arranged reshaping parts, FIG. 5 shows a reshaped edge zone of a film, the reshaping of which has been executed in three reshaping steps, FIG. 6 is a side view of the film of FIG. 5 with an illustration of the change of geometry in the three reshaping steps.

DESCRIPTION OF THE PREFERRED EMBODIMENTS

Figure 1:
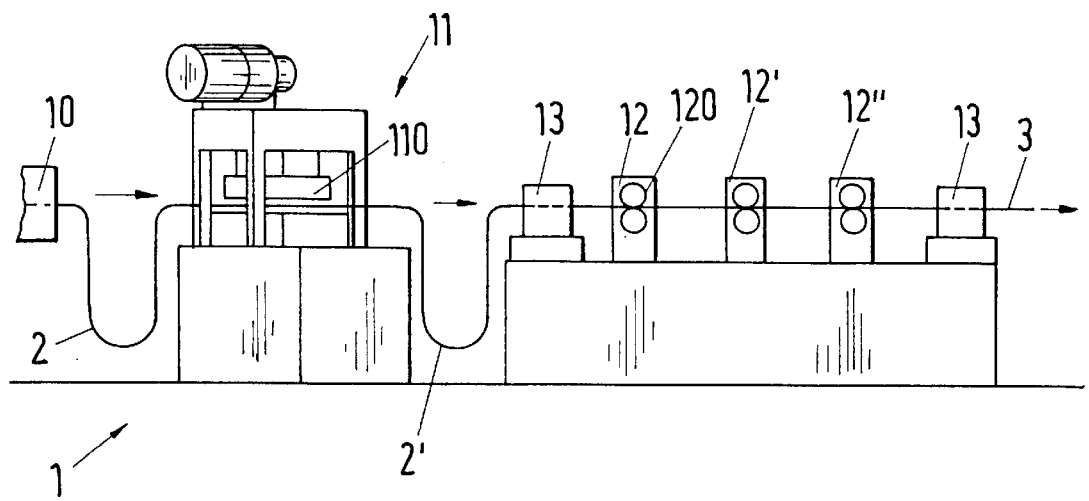
FIG. 1 shows a plant for carrying out the method in accordance with the invention.

The plant which is illustrated in FIG. 1 comprises the following components: a device 10 for continuously forwarding a film strip 2 from a non-illustrated film supply to shaping units 11, 12, 12', 12"; a first shaping unit 11 for pleating the film strip 2, with a corrugated or zigzag-shaped film strip 2' being formed; three shaping units 12, 12', 12" for reshaping the film strip 2' by means of a roller pair 120 in each case; apparatuses 13 for drawing off the shaped film strips 2' and 3. The pleating can be carried out with a pair of gear-like rollers or through pressing with an oscillating tool 110. Details of the procedure of pleating (or "inclined pleating") can be found in EP-A 0 739 846.

Figure 2:
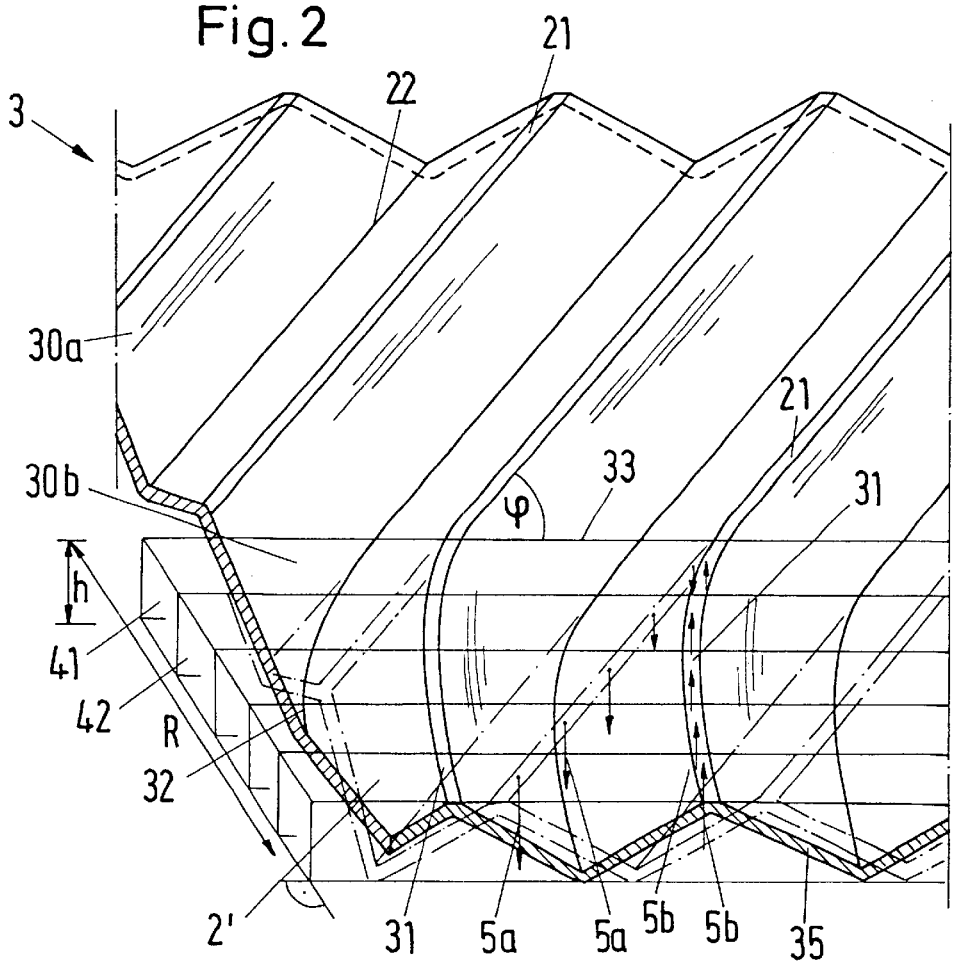
FIG. 2 shows an edge zone which has been reshaped in accordance with the method in accordance with the invention.

FIG. 2 shows a part of a pleated film strip 3 which has resulted from a film strip 2' through the reshaping of an edge zone 30b of width R. A second edge zone, which is likewise reshaped, does not appear in the drawing. Only a middle zone 30a or a part of this zone is illustrated. The original pleating of the film strip 2' is present in the middle zone 30a with straight, parallel ridges or edges 21, 22. In the edge zone 30b the original pleating is indicated in chain-dotted lines. An outer cut edge 35 of the edge zone 30b extends parallel to a non-illustrated edge of the film strip 2'. The ridges or edges 21, 22 subtend an angle of inclination $\phi$ to a straight line 33 which extends parallel to the cut edge 35. Edges 31, 32 of the edge zone 30b which lie on curved paths form variable angles of inclination which are formed by the tangents at the named curves and the straight line 33. These variable angles of inclination increase continuously from the middle zone 30a to the strip edge (or cut edge 35).

The film strip 3 has a height h; this yields the layer widths of a packing with a cross channel structure which is produced from pieces of the film strip 3 and through a layered construction.

For the explanation of the reshaping the edge zone 30b in FIG. 2 is subdivided into a plurality of strips which correspondingly subdivide a disc-like volume of height h and width R into bar-shaped partial volumes 41, 42, . . . It is illustrated for an edge 21 or 31 respectively by arrows 5a and 5b which are associated with the partial volumes 41, 42, . . . how individual surface elements of the horizontally lying film 2' are vertically displaced during the reshaping. The lengths of the arrows 5a and 5b show qualitatively how large the displacements of the surface elements are; these lengths are approximately proportional to the paths travelled during the displacements. Through a plastic deformation which is carried out by means of a roller pair the ridges or edges 21 of the original pleating are eliminated (arrows 5a) and replaced by curved edges 31 (arrows 5b). The elimination of the edge 21 and the new formation of the edge 31 which takes place adjacently occur practically simultaneously.

FIG. 3 shows a cross-section through the upper roller 121 of the roller pair 120. The tooth profile of the lower roller 122 is illustrated in chain-dotted lines. Between the two rollers 121 and 122 there is a settable gap 123 which is set according to the thickness of the film 2'. The directions of rotation are illustrated by the arrows 61 and 62.

The rollers 121, 122 can be manufactured from a large number of lamella by means of which the roller profile can be formed in a simple manner instead of from a solid piece. All lamella have in each case a same gear profile. Adjacent lamella are arranged adjacently with a displacement by angles, with the angles being determined by the required shape of the roller profiling and the lamella thickness.

The rollers 121 and 122 respectively advantageously comprise two axially arranged reshaping parts 122a and 122b on a drive shaft 124: see FIG. 4, in which the lower roller 122 of FIG. 3 is illustrated. Each reshaping part 122a and 122b receives a reshaping profile 130b for reshaping the edge zones 30*b* (width R) and a profile 130*a* which engages without reshaping into the profile given by the pleating of the film strip to be processed. Between the reshaping parts 122*a* and 122*b,* which are secured to a cylindrical carrier body 124', there is a ring groove with settable groove width b. The reshaping is carried out at a set groove width b for which the reshaped film strip 3 is held within the reshaping profile in spite of a transverse expansion of the edge zones. This transverse expansion, which can amount to about 1 to 3 mm, arises as a result of the plastic deformation. The groove width b is preferably set in such a manner that when emerging from the roller pair 120 the film edges 36 (see FIG. 5) come to lie on the outer edges 135 of the reshaping profile 130*b* so that the roller width B is thus just as large as the width of the film strip 3 after the reshaping. For setting the width B the carrier body 124' and connecting means between this carrier body 124' and the reshaping parts 121, 122 are constructed suitably. The width B is expediently increased in that the two reshaping parts 121, 122 are displaced in opposite directions along the arrows 6*a* and 6*b* shown in FIG. 4.

At the exit of the roller pair 120 the film strip 3 must be guided at the edges in such a manner that a movement of the strip 3 transversely to the forwarding direction is prevented.

FIG. 5 shows the edge region of a film strip 3, which is manufactured by means of three reshaping steps from a pleated film strip 2' (ridges or edges 21 and 22 in chain-dotted lines). As soon as an edge 31 which is formed during the reshaping and which lies upwardly crosses an adjacent edge 21 of the original film strip 2' which likewise lies upwardly, at the point 7, then at least a second reshaping step is necessary. For each reshaping step however only two directly adjacent edges 21 (lying upwardly) and 22 (lying downwardly) can be reshaped at the same time. Since in the illustrated example the edge 31 crosses two adjacent upwardly lying edges 21, namely at the points 7 and 8, a total of three reshaping steps is required.

In the reshaping steps a zigzag profile of the strip edge 36 is displaced successively to the right: see FIG. 6. In the uppermost partial figure the edge 36' of the not yet reshaped film strip 2' is shown. The second partial figure shows the displaced zigzag profile after the first reshaping step. The horizontal arrow 81 indicates how the edge 21 appears anew as the edge 31'. The vertical arrows 5 indicate how surface elements are displaced upwardly or downwardly as a result of the reshaping. The arrows 82 and 83 represent the further displacements of the edges 31' and 31" respectively in the second and third reshaping step, with the edge 31" merging into the edge 31 in FIG. 5 in the third step.

In the last reshaping step the edge zone 30*b* is designed in such a manner that the angle of inclination at the film edges 36 is greater than 80° and such that it preferably amounts to 90°.

Figure 7:
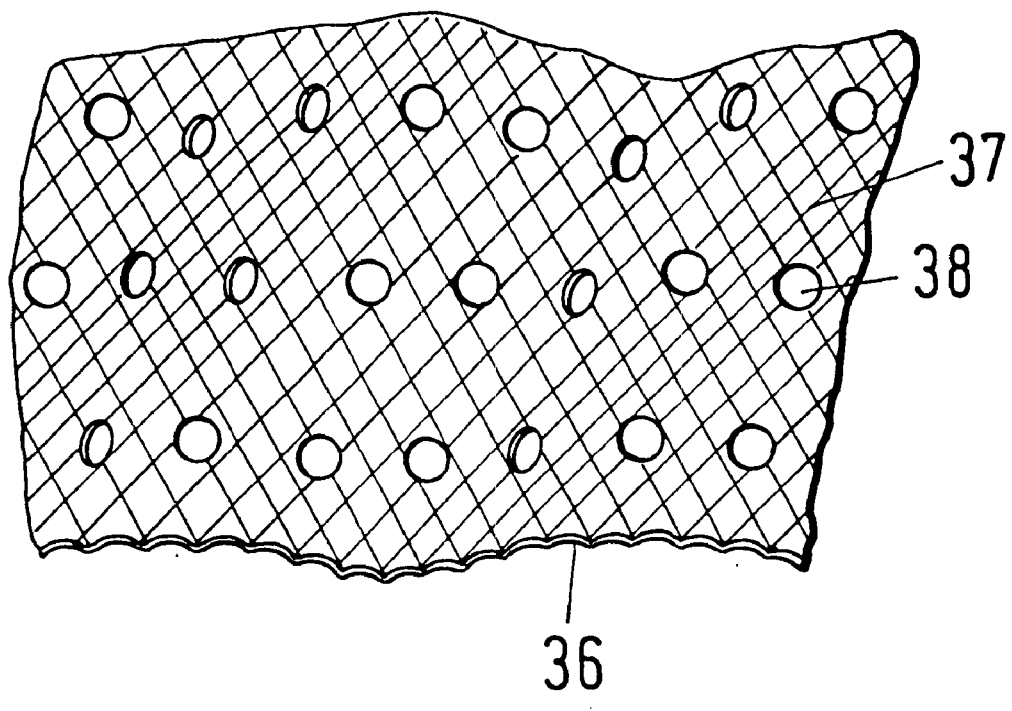
FIG. 7 shows a fragment of a film which has a furrowing as well as a perforation.

In the pleating a value in the range from 20° to 70° can be chosen for the angle of inclination φ of the film strip 2'. Films can be used which have a fine structuring for example in the form of a furrowing and/or a perforation for example through holes which are arranged in a grid-like manner. FIG. 7 shows a corrugated film with a furrowing 37 which is formed by crossing furrows. This film is also perforated by holes 38 which are arranged in a grid-like manner. The reshaping which is carried out in the method in accordance with the invention leaves a given fine structuring largely intact.

What is claimed is:

1. Method for shaping a film comprising
   a) continuously forwarding a film strip from a film supply to shaping units,
   b) pleating of the film strip in a first shaping unit and producing ridges which form an angle of inclination to edges of the film strip having a constant value,
   c) forwarding the pleated strip to at least one further shaping unit, and thereafter reshaping the film strip in one or more steps to eliminate the ridges through plastic deformation by means of a roller pair in edge zones outside of a middle zone of the strip and at the same time replacing the eliminated ridges with curved edges having angles of inclination which continuously increase from the middle zone to the strip edges.

2. Method in accordance with claim 1 including choosing a value in the range from 20° to 70° for the angle of inclination of the pleating; and wherein shapeable and reshapeable material strips are used as films which have a fine structuring in the form of a furrowing and/or a uniform perforation through holes which are arranged in the manner of a grid.

3. Method in accordance with claim 1 wherein each of the rollers of the roller pair comprises first and second axially arranged reshaping parts which in each case contain a reshaping profile for reshaping the edge zones and between which a ring groove with a settable groove width (b) remains open; and wherein the reshaping is carried out at a set groove width for which the reshaped film strip is held within the reshaping profile in spite of a transversal expansion of the edge zones in such a manner that the film edges come to lie on the outer edges of the reshaping profile when emerging from the roller pair.

4. Method in accordance with claim 1 wherein for each reshaping step only two directly adjacent edges of the film strip are reshaped simultaneously.

5. Method in accordance with claim 1 including guiding the film strip upon its emergence from the roller pair at the edges in such a manner that a movement of the strip transversely to the forwarding direction is prevented.

6. Method in accordance with claim 1 wherein pleating is carried out with a pair of rollers or through reshaping with an oscillating tool.

7. Method in accordance with claim 1 wherein in the last reshaping step the edge zones are formed in such a manner that at the film edges the angle of inclination is greater than 80°.

* * * * *